Patented Apr. 5, 1927.

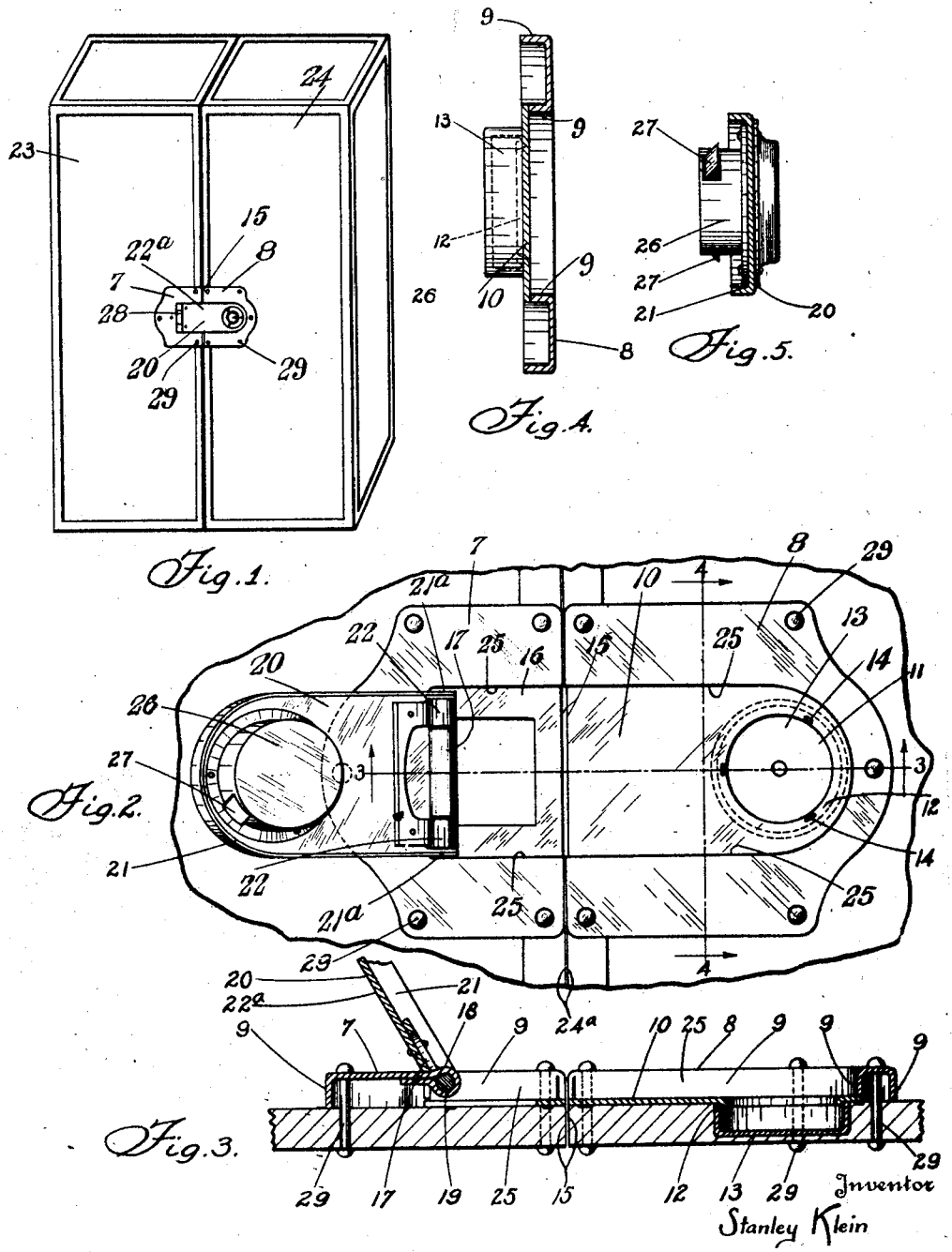

1,623,190

UNITED STATES PATENT OFFICE.

STANLEY KLEIN, OF CINCINNATI, OHIO, ASSIGNOR TO THE MENDEL-DRUCKER COMPANY, OF CINCINNATI, OHIO, A CORPORATION OF OHIO.

TRUNK-LOCK STRUCTURE.

Application filed January 12, 1925. Serial No. 1,830.

An object of my invention is to provide a trunk locking means which will preclude relative movement of the trunk body and trunk lid.

Another object is to provide a device of this type wherein the stresses tending to cause relative movement of the body and lid portions are received by especially constructed members of the device.

Another object is to provide a device of this kind wherein the lock bolts and hasp hinge are protected from stresses to which they are normally subjected due to rough handling.

Another object is to provide a device of this type for trunks and the like wherein the necessity for auxiliary bolts and dowels is eliminated.

These and other objects are attained by the means described herein and disclosed in the accompanying drawings, in which:

Fig. 1 is a perspective view of a trunk having embodied therein a locking device of my invention, said device being shown in a locked position.

Fig. 2 is an enlarged plan view of the device in an open position and shown as applied to a trunk body and lid.

Fig. 3 is a cross sectional view on line 3—3 of Fig. 2, parts being broken away.

Fig. 4 is a cross sectional view on line 4—4 of Fig. 2.

Fig. 5 is a view partly in cross section showing a locking element and mounting such as may be employed with the device of my invention.

The device comprises a pair of flat plates 7 and 8 substantially U-shaped in plan view, and each plate is provided with a downwardly extending flange portion 9 extending about each of its edges. The flange 9 bordering the inner opening of the U-shaped plate 8 has mounted upon its edges a plate 10 provided with a perforation 11 surrounding which perforation is an annular flange 12. The plate 10 is secured upon the edge of the flange 9 by any suitable means such as riveting, brazing or the like so that the plate 10 forms the bottom wall of a recess and the flanges 9 surrounding the opening in the plate 8 form the side walls of the said recess. A cup like lock receiving structure 13 surrounds the flange 12 on the plate 10 and is secured to said plate in substantially the same manner as the plate 10 is secured to the flanges 9, see Figs. 2 and 4, for example by means of rivets 14. It will be observed from the disclosure in Fig. 4 that the flange 12 extends into the cup 13 and provides a ledge therein. The perforation 11 and cup 13 are positioned adjacent the end farthest from the outer edge 15 of the plate 10. The plate 7 has mounted upon the flanges 9 bordering the inner opening a plate 16 whereby a flat recess is formed in the plate 7 substantially like the recess in the plate 8. A tongue 17 struck from the plate 7, within the U-shaped opening therein, is bent and turned upon itself to provide an integral hinge member 18 for receiving a pintle 19. A leaf or hasp 20 carries a flange 21 about its outer edges and carries preferably integral hinge portions 22 so that the leaf or hasp 20 may be hingedly mounted at one end of the aperture in the plate 7 with its top surface 22$^a$ substantially flush with the top surface of the plates 7 and 8. As disclosed in Fig. 1, the hasp 20 is adapted to seat in and completely fill the recesses in the plates 7 and 8 when said recesses are brought into alignment with the edges 15 of the plates in substantial abutment. The plates 7 and 8 are adapted to be mounted upon a trunk body 23 and lid 24 with the edges 15 of the plates in alignment with the edges 24$^a$ of said body and lid and the side walls 25 of the apertures in alignment. When the trunk is closed, the hasp 20 may be seated in the recesses in the plates 7 and 8 with the flange 21 of the hasp 20 engaging the walls 25 of the aperture comprising the flanges 9 of the plates 7 and 8. The free end of the hasp 20 is provided with a cylindrical lock 26 having reciprocating bolts or locking members 27. When the hasp 20 is pressed into the apertures in the plates, the lock 26 passes through the perforation 11 in the plate 10 and enters the cup 13 attached thereto, the bolts 27 of the lock being adapted to project and extend beyond the annular flange 12 whereby the hasp 20 is locked in the recesses in the plates 7 and 8, thus locking the trunk.

It will be noted that the apertures in the plates 7 and 8 are somewhat elongated and that the hinge 28 and the lock 26 are located at the extreme ends of the combined apertures and are spaced from the edges 24ª of the trunk body and lid at substantially one-half of the length of the combined apertures. The plates 7 and 8 being rigidly secured to the trunk members by any suitable means such as rivets 29, it will be observed that when the trunk is closed and the hasp member 20 is locked in position that any opposed stresses acting upon the body and lid will be directed to the side walls 25 of the apertures and the flanges 21 and hasp body 20 positioned therebetween and to the end that hinge 28 and lock 26 are entirely relieved from the effects of such stresses. By making the plates 7 and 8 and the hasp 20 of a suitable heavy gage metal and these members being additionally strengthened by virtue of the flanges bordering the members, a trunk may be so secured against relative movement of the body and lid portions, that the usual dowels, side catches or side bolts may be dispensed with for the reason that the locking means will perform the function of such said bolts without any danger of weakening the hinge or lock connections. It will be readily apparent that a structure of this type may be manufactured as economically as the ordinary type of trunk fixture and that the cost of said bolts or the like and the labor inicdental to assembling such accessories upon a trunk will be saved.

It should also be noted that the flanges 21 at points 21ª are always disposed within the recess and in such proximity to walls 25 thereof as to preclude tampering with or removal of the pintle 19 of the hinge, whether the hasp be open or locked upon the plate 8. This is readily apparent from the fact that the portions 21ª of the flange are not accessible unless the hinge members 17 and 22 be first removed. This structure also precludes accidental displacement of the pintle 19.

What I claim is:

1. In a device of the class described the combination with a plate having a recess extending from one edge of the plate and for a distance across the top of said plate, an integral tongue on the plate turned upon itself to form a tubular hinge member, and positioned substantially within the recess in the plate, a flanged hasp adapted to seat in the recess in the plate with its flanged sides in abutment with the walls of the recess, an integral complementary hinge member on one end of the hasp, and a pintle for hingedly mounting the hinge members one upon the other, the flanges on the hasp precluding access to the pintle.

2. In a device of the class described, the combination of a pair of plates each having a recess extending from one edge thereof and for a distance across the top of said plate, the side walls of the recesses being parallel one to the other and substantially perpendicular to the bottoms of said recesses, an integral tongue turned upon itself to form a tubular hinge member positioned within the recess in one plate, a hasp pivotally mounted upon the tubular hinged member and provided with a depending flange adapted to enter the recesses in the plates, the flange seating upon the bottoms of the recesses and having its side walls in abutment with the side walls of the recesses and complementary means on the hasp and the second mentioned plate for locking the hasp in the recesses.

In testimony whereof, I have hereunto subscribed my name this 6th day of January, 1925.

STANLEY KLEIN.